United States Patent Office 3,701,789
Patented Oct. 31, 1972

3,701,789
PROCESS FOR JOINTLY PRODUCING FURFURAL AND LEVULINIC ACID FROM BAGASSE AND OTHER LIGNOCELLULOSIC MATERIALS
Emiliano Ramos-Rodriguez, San Juan, Puerto Rico, assignor to Commonwealth of Puerto Rico
No Drawing. Filed Oct. 15, 1970, Ser. No. 81,154
Int. Cl. C07d 5/22
U.S. Cl. 260—347.9   8 Claims

ABSTRACT OF THE DISCLOSURE

The production of furfural and levulinic acid in high yields from lignocellulosic material, such as bagasse, in a single cook by heating within the range of 160°–170° C. in a closed vessel under saturating pressure in an aqueous sulfuric acid cooking liquor of relatively low concentration and with a relatively low lignocellulosic material to cooking liquor ratio to cause extensive depolymerization of carbohydrate polymers and material formation of free pentoses and hexoses but little production of furfural or levulinic acid; isothermally distilling off at a temperature within this range the furfural formed and being formed, whereby a cooking liquor more concentrated with respect to sulfuric acid is produced; and heating the resulting reaction mixture to a temperature within the range of 185°–210° C., this temperature being maintained until optimum production of levulinic acid is achieved.

DESCRIPTION OF THE INVENTION

This invention relates to a process for jointly producing furfural and levulinic acid in high yields from lignocellulosic materials, such as sugar cane bagasse, corn cobs, rice hulls, oat's residues, etc., in one and same cook in a batch digester, or in one and same continuous flow of materials through a continuous digester. There exist in the prior art mainly processes for producing levulinic acid either directly from the raw lignocellulosic material without regard for the furfural, or from the residue left over after the extraction of furfural, both processes usually being carried out separately for best results and not in one and the same cook.

When the simultaneous or successive production of furfural and levulinic acid is attempted in one and the same cook, optimum yields of both products are not obtained by using methods which work acceptably and successfully for the separate production of furfural and levulinic acid. When the process is carried out so as to optimize the production of both products by using techniques described for separate production, the yields of either or both furfural and levulinic acid are prone to be low and unsatisfactory due mainly (but not only) to uncontrolled side reactions. Thus either the production of furfural is maintained at a high yield level and that of levulinic acid and below the optimum value, or the yield of levulinic acid is high and that of furfural unsatisfactory.

The advantage and utility of my invention is the economical and practical production of both furfural and levulinic acid in high yields, with lower ratios of liquor to lignocellulosic material than has been possible previously in this high level of yields, in one and same cook or in a continuous manner, which in any case reduces handling, heating expenses and equipment expenditures. All such advantages are secured without the undue expense of a catalytic agent, because the simultaneous and successive production of furfural and levulinic acid permits a much better utilization of heating agents and catalysts, such as are needed to effect the chemical transformation of the lignocellulosic material according to embodiments of this invention. From sugar cane bagasse, for example, where the average potential yield of furfural and levulinic acid can be estimated at 45.5%, yields by the process of this invention can reach up to 61% of this potential.

The invention has the further advantage that it is well adapted to the recovery of levulinic acid from the residual cooking liquor either by direct distillation or by direct extraction with solvents, or by conversion into the calcium salt. Mixed methods of extraction can conveniently be devised in special cases. When levulinic acid is extracted as the calcium salt through crystallization, a recovery of sulfuric acid and lime is possible through known technology.

The high yields of both furfural and levulinic acid are obtained by working at all times under conditions whereby production of both chemicals are simultaneously and successively optimized throughout the cycles of reaction in order to avoid undesirable and not too well known side reactions which occur mainly with intermediates formed in the course of the transformation of pentose and hexose sugars into furfural and levulinic acid respectively. Such conditions are not made evident by any prior art of which I am aware.

It is well known that in order to obtain optimum yields of levulinic acid from hexose-containing liquors it is advantageous to keep a high ratio of liquor to lignocellulosic material. This means that a lower concentration of hexose-yielding material should promote a higher yield of levulinic acid. This is proved for sugar cane bagasse in the following table:

Yield of Levulinic Acid and Furfural With Variable Bagasse Quantity in 4500 ml. of Liquor

| Bagasse (grams) | H₂SO₄ (grams) | Total distillate (ml.) | Percent on oven dry bagasse | |
|---|---|---|---|---|
| | | | Furfural | Levulinic acid |
| 453 | 25 | 2,930 | 8.66 | 11.10 |
| 353 | 25 | 3,148 | 9.82 | 13.60 |
| 300 | 25 | 2,970 | 10.46 | 14.10 |
| 200 | 25 | 2,980 | 10.52 | 14.20 |

We have unexpectedly found that it is possible by working according to embodiments of this invention to obtain considerably higher yields of levulinic acid than are theoretically to be expected from the concentration of lignocellulosic material, thus permitting the use of lower ratios of liquor to lignocellulosic material without detriment to excellent yields of furfural. All this is of obvious technical and economical advantage.

It has also been found that the method according to the invention, while permitting the attainment of high yields of both levulinic acid and furfural, leaves behind a porous and easily filterable humin residue, such as that usually accompanying the production of levulinic acid, and which, if this method were departed from, might be left in a condition of very poor filterability to the great disadvantage of the process.

According to the present method, sulfuric acid is the preferred catalyst to use in the hydrolysis of the lignocellulosic material to set free the pentoses and hexoses, the initial ratio of liquor to lignocellulosic material ranging from 8:1 to 12:1, giving a ratio of liquor to potential carbohydrate from about 16:1 to 20:1. The preferred initial concentration of sulfuric acid by volume is 1.33%, but may range from 1% to 1.62%. Preferably, the lignocellulosic material is comminuted and pre-impregnated with the aqueous acid solution which is to be used as the cooking liquor.

The present process consists of three main distinct steps, which are of equal importance in the achievement of optimum results. In the first step, the reaction mass of lignocellulosic material and cooking liquor is heated to a temperature from 160°–170° C. in a closed vessel under saturating pressure. This temperature should be reached at such a rate and in such a manner that at the end of this step a large depolymerization has been effected in the carbohydrate polymers yet present and about 50% or less of the lignocellulosic material has gone into solution. However, less than 20% of the potential hexose content should be in the free monomeric form and less than 55% of the potential pentose content, preferably not over 40%, is to be present in this form. The ratio of percent of free sugars present should be about 1:3 of hexose to pentose, while the production of furfural or levulinic acid is kept below 2–3%. This heating should ordinarily be accomplished in no more than 70 minutes.

In the second step immediately following the first, continuous isothermal distillation within the above temperature range is carried out to remove the furfural as it is produced, while bringing about at the same time a concomitant concentration of the catalyst at a convenient rate. Distillation is readily effected by the opening of a valve to the required extent, and distillation is continued until from 67% to 78% of the initial cooking liquor has gone over as distillate. In this step substantially all of the pentoses and pentose-yielding carbohydrates are transformed into furfural and simultaneously a noticeable production of levulinic acid is begun, but the rate of distillation and temperature of distillation must be chosen so that not less than 40% and not over 75%, preferably 70% to 75%, of the total attainable yield of levulinic acid should be obtained at the end of the distillation period in order to achieve the best results with respect to the attainment of high yields of both products. By distilling furfural at 170° C. up to about 78% of highest possible yield of levulinic acid is simultaneously obtained via hydroxymethylfurfural, the production of levulinic acid increasing rapidly from 165° C. up. Distillation should be completed in no more than 55 minutes. Furfural is recovered from the distillate in a conventional manner.

During the third step, the furfural distillation having been completed and the concentration of catalyst having been raised to a level between 3–6 times higher than it was at the beginning of the cook, preferably to about 4–4.5% by volume of cooking liquor, the reaction vessel is again closed and the temperature is raised to a point between 185°–210° C. preferably to 195° C. in from 3 to 12 minutes, preferably in less than 8 minutes, and the mixture is kept at the final temperature for from 5 to 10 minutes, although a time up to 20 minutes shows little adverse effect on the observed yield.

The following table shows the effect of the quantity of sulfuric acid catalyst on the yield of levulinic acid:

Levulinic Acid Yield With Variable Catalyst Quantity in 4500 ml. of Liquor

| Run | $H_2SO_4$ (grams) | Bagasse (grams) | Percent yield levulinic acid on dry oven bagasse |
| --- | --- | --- | --- |
| 1 | 10 | 353 | 5.4 |
| 2 | 20 | 353 | 13.8 |
| 3 | 30 | 353 | 15.4 |
| 4 | 40 | 353 | 16.9 |
| 5 | 50 | 353 | 18.0 |

The foregoing table shows that the yield of levulinic acid is a linear function of $$r = \frac{100 \times \text{concentration of } H_2SO_4 \text{ (g./l.)}}{\text{dry weight of bagasse (g.)}}$$

for $r > 2$. According to the method of the invention, I have been able to increase by about 30% the amount of lignocellulosic material treated (bagasse) while still getting a yield of levulinic acid higher than predicted from this linear relation when using, for example, $r = 2.94$. This is an unexpected result in view of the tendency toward lower yields as the quantity of lignocellulosic material is increased. It was therefore found that the concentration of catalyst obtained by carrying out distillation within the indicated range, brings about in the last step a far more efficient conversion of hydroxymethylfurfural into levulinic acid, as the former evolves from free hexose initially present and that liberated in the course of the third step, by increasing the rate of decomposition and by avoiding side reactions with intermediates. The adverse effect of insufficient concentration of catalyst in the last step is shown in the following table where, after distilling, water was added to the reaction mixture in the amount of 2000 ml. and the distillation was continued for some time, so that the last step, after distilling off the furfural, was conducted at a catalyst concentration of only 2.6% by volume of liquor:

| Experiment | 1 |
| --- | --- |
| No. of runs | 5 |
| Bagasse (grs.) | 453 |
| $H_2SO_4$ (grs.) | 64 |
| Total distillate (mls.) | 4,000 |
| Percent yield levulinic acid on oven dry bagasse | 13.7 |

It was found that outside the optimum range of catalyst concentration already stated the yield of levulinic acid tends to be lowered, usually by 3 to 4%, based on the oven dry weight of lignocellulosic material.

Levulinic acid is readily isolated from the final aqueous solution containing the same by conventional techniques. Thus the levulinic acid may be extracted by a suitable organic solvent, by precipitation as the calcium salt or by a combination of these procedures.

As a further advantage of my method, it can be stated that it is also possible to reuse the final levulinic acid liquor with a new charge of lignocellulosic material without removal of the levulinic acid present after filtering off the humic residue and bringing back the quantity of liquor and catalyst to initial values. No reduction is noticed in the yield of furfural and only a small decrease is observed in the ultimate yield of levulinic acid. After only one reuse, a final concentration of levulinic acid in liquor of over 10% by weight is easily realized. A higher concentration is attainable, if desired by recycling up to three times, and this is a real technical and economic advantage when solvent extraction is used to separate the levulinic acid. A preferred technique is to first remove as much as possible of the levulinic acid by extraction with a conventional solvent for this purpose and then recover the residual levulinic from the aqueous phase by crystallization as the calcium salt.

In summary, I treat the lignocellulosic material with a solution of non-volatile acid such as sulfuric acid of convenient initial concentration and heat the mixture under saturating pressure, the material being conveniently comminuted and pre-impregnated with the liquor if necessary. The heating rate to be maintained is such that when the temperature reaches 160° C. only a small amount of furfural has been formed and only about 40% of the lignocellulosic material has gone into solution. This is done in such a way that only a prescribed fraction of the carbohydrate polymers is found in the monomeric condition as free pentoses and hexoses. Distillation is carried out between 160°–170° C., preferably at 168° C. with agitation, at such a rate that bound pentoses reaching monomeric condition are immediately decomposed into furfural which is readily distilled off as it is formed. This distillation is continued until from 67% to 78% of the initial liquor has been converted into distillate, at which time about 70% to 75% of the total practical yield of levulinic acid has been attained. Distillation is then discontinued and the residual mass is rapidly heated, preferably to 195° C., and kept at this temperature for a time of at least five minutes and not over twenty.

The foregoing description affords simultaneous and successive production of furfural and levulinic acid from lignocellulosic materials, especially sugar cane bagasse with optimum yields of both compounds in a single cycle of cooking which in no case exceeds two hours, and gives higher yields than have hitherto been reported for their simultaneous production.

The following examples are given as illustrative of the invention but not as limiting the same:

EXAMPLE I 453 grs. of comminuted sugar cane bagasse are mixed with 4500 mls. of an aqueous solution containing 60 grs. of sulfuric acid. The mixture is heated in a closed reactor under saturating pressure at a rate such that it reaches the temperature of 165° C. in sixty minutes. At this instant the reactor is bled under agitation and continued heating to distill off 3000 parts of a furfural distillate in 45 minutes. The valve is then closed and the temperature raised to 195° C. and maintained for exactly 5 minutes and then immediaely cooled. Yields based on oven dry bagasse were as follows: furfural, 9.62%, and levulinic acid, 16.5%. Total time of cycle: 117½ minutes.

EXAMPLE II

The same general procedure as that of Example I was followed but the temperature of distillation was maintained at 168° C., reaching this temperature in 63 minutes and kept constant during the distilling step for exactly 45 minutes. The reaction mass, after distillation, was heated from 168° C. to 195° C. in five minutes and held at this last temperature for exactly five minutes. The yields based on oven dry bagasse were as follows: furfural, 10.10% and levulinic acid, 17.54%. Total time of cycle: 118 minutes.

EXAMPLE III

The procedure of Examples I and II were followed except that the distillation temperature was raised to 170° C. and the time to reach this temperature was 62 minutes. Continuous bleed for distillation at a constant temperature of 170° C. lasted 45 minutes. Yields based on oven dry bagasse were as follows: furfural, 8.08% and levulinic acid 17%. Total time of cycle: 118 minutes.

EXAMPLE IV 361 grs. of rice hulls properly comminuted were heated under saturating pressure in 4500 mls. of an aqueous solution containing 60 grs. of sulfuric acid until a temperature of 168° C. was reached and the reaction mass was held at this temperature while distilling off 3000 mls. during 56 minutes. The distillation was then discontinued and the temperature raised from 168° to 195° C. in 6 minutes, the reaction mixture being kept at this last temperature for exactly 5 minutes. Yields based on oven dry rice hulls were as follows: furfural, 7.20% and levulinic acid, 11.65%.

EXAMPLE V 500 grs. of oat's residue were treated with 4500 mls. of an aqueous solution containing 73 grs. of sulfuric acid by heating under saturating pressure to 168° C. in 65 minutes, followed by distillation at this last temperature until 3200 mls. were distilled off. The reaction mixture was then heated to 195° C. in 6 minutes and kept at this last temperature exactly 5 minutes. Yields based on oven dry oat hulls were as follows: furfural, 12.08% and levulinic acid, 12.12%.

In this specification and the appended claims the term "saturating pressure" means the pressure that is automatically developed by the heating of the aqueous liquor in the closed vessel. Such a condition of closed vessel operation takes place during the first and third steps of the process, but not during the distillation of furfural, which is called the second step.

As the present invention has to do with production of furfural and levulinic acid, the isolation of either product is not disclosed. Solvent extraction processes are known in the art, and the isolation of levulinic acid as the calcium salt is disclosed in my co-pending application Ser. No. 848,462, filed Aug. 8, 1969, now U.S. Pat. No. 3,663,612 for Method of Separating Levulinic Acid as an Alkaline-Earth Levulinate From Sugarcane Bagasse.

I claim:

1. A method of producing both furfural and levulinic acid in high yields from a lignocellulosic material in a single cook, comprising the steps of (1) heating said material in a closed reaction vessel under saturating pressure in an aqueous sulfuric acid cooking liquor to a temperature within the range of 160°–170° C. over a period of time and at a rate such that extensive depolymerization of carbohydrate polymers occurs but less than 20% of the potential hexose content and less than 55% of the potential pentose content are present in monomeric form, the concentration of sulfuric acid in said cooking liquor being from 1.0% to 1.62% by volume and the ratio of cooking liquor to lignocellulosic material ranging from 8:1 to 12:1; (2) distilling off the furfural present and being formed at a temperature within the above range, distillation being continued until substantially all of the pentoses and pentose-producing carbohydrates have been converted to furfural, the volume of cooking liquor has been reduced so that the concentration of sulfuric is 3 to 6 times higher than the initial level and from 30% to 75% of the total possible amount of levulinic acid has been produced from the hexose-producing carbohydrates; and (3) again closing said reaction vessel and raising the temperature of the remaining reaction mixture to a point within the range of 185°–210° C., the temperature being maintained until production of levulinic acid is substantially complete.

2. A method as claimed in claim 1 in which said lignocellulosic material is sugar cane bagasse.

3. A method as claimed in claim 2 in which the concentration of sulfuric acid in said cooking liquor is about 1.33% by volume.

4. A method as claimed in claim 2 in which heating in step (1) is continued for no more than 70 minutes; distillation in step (2) is continued for no more than 55 minutes and the temperature in stage 3 in maintained for from 5 to 20 minutes.

5. A method as claimed in claim 3 in which the distillation of step (2) is conducted at about 168° C. and the concentration of sulfuric acid in the cooking liquor after completion of distillation is about 4% by volume and in step (3) the reaction mixture is heated to about 195° C. in less than 8 minutes and kept at this temperature for 5 minutes, followed by rapid cooling.

6. A method as claimed in claim 2 in which said sugar cane bagasse is comminuated and pre-impregnated with said cooking liquor.

7. A method as claimed in claim 1 in which the reaction mixture resulting from step (3) containing levulinic acid is recycled at least once for reuse in step (1) after restoring the quantity of sulfuric acid and cooking liquor to initial values to obtain a final reaction mixture having a levulinic acid content of over 10% by weight which is solvent extracted for recovery of said levulinic acid.

8. A method as claimed in claim 7 wherein after solvent extraction, the residual levulinic acid is recovered as the calcium salt.

References Cited

Ramos et al., Proc. Int. Soc. Sugar-Cane Technology, 1968, published 1969, 13, pp. 1900–11 (Eng.), Elsevier Publ. Co., Amsterdam, Netherlands.

ALEX MAZEL, Primary Examiner

B. DENTZ, Assistant Examiner

U.S. Cl. X.R.

260—527; 127—37